(12) United States Patent
Chhodavdia

(10) Patent No.: US 10,936,771 B1
(45) Date of Patent: Mar. 2, 2021

(54) USING A COMMON FUSE CONTROLLER HARDWARE DESIGN FOR DIFFERENT APPLICATIONS

(71) Applicant: Microsoft Technology Licensing, LLC, Redmond, WA (US)

(72) Inventor: Avdhesh Chhodavdia, Freemont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/590,977

(22) Filed: Oct. 2, 2019

(51) Int. Cl.
| | | |
|---|---|---|
| *G06F 17/50* | (2006.01) | |
| *G06F 9/00* | (2006.01) | |
| *G06F 30/30* | (2020.01) | |
| *G06F 9/50* | (2006.01) | |
| *G06F 30/323* | (2020.01) | |
| *G06F 30/327* | (2020.01) | |
| *G06F 30/343* | (2020.01) | |

(52) U.S. Cl.
CPC ............ *G06F 30/30* (2020.01); *G06F 9/5011* (2013.01); *G06F 9/5044* (2013.01); *G06F 30/323* (2020.01); *G06F 30/327* (2020.01); *G06F 30/343* (2020.01)

(58) Field of Classification Search
CPC ........ G06F 30/30; G06F 30/32; G06F 30/323; G06F 30/327; G06F 30/34; G06F 30/343; G06F 9/5044; G06F 9/5011
USPC ........... 716/138, 104, 103, 117, 128; 703/14
See application file for complete search history.

(56) References Cited

U.S. PATENT DOCUMENTS

| | | | | |
|---|---|---|---|---|
| 7,062,425 | B1 * | 6/2006 | Bell | ........................ G06F 30/33 703/14 |
| 9,042,551 | B2 | 5/2015 | Fifield et al. | |
| 9,436,844 | B2 | 9/2016 | Love et al. | |
| 9,569,443 | B1 * | 2/2017 | van Rietschote | ..... G06F 16/116 |
| 9,613,215 | B2 | 4/2017 | Cox et al. | |
| 9,716,708 | B2 | 7/2017 | Love et al. | |
| 2003/0056035 | A1 * | 3/2003 | Rai | ........................ G09G 5/363 710/5 |
| 2008/0310622 | A1 | 12/2008 | Drehmel et al. | |

(Continued)

OTHER PUBLICATIONS

Greaves, "System on Chip Design and Modeling, D&M Patterns Portfolio", University of Cambridge Computer Laboratory, Jan. 2018, 255 pages. (Year: 2018).*

(Continued)

*Primary Examiner* — Phallaka Kik
(74) *Attorney, Agent, or Firm* — Ranjeev Singh; Singh Law, PLLC

(57) ABSTRACT

Systems and methods for using a common fuse controller hardware design for different applications are described. A method includes specifying a first fuse map for a first system on a chip (SoC) and a second fuse map for a second SoC. The method further includes processing the first fuse map to generate a first hardware description language (HDL) file and processing the second fuse map to generate a second HDL file. The method further includes using a processor, compiling a common hardware state machine HDL file with the first HDL file to generate a first output file capturing behavior expressed in the first fuse map or compiling the common hardware state machine HDL file with the second HDL file to generate a second output file capturing behavior expressed in the second fuse map.

20 Claims, 10 Drawing Sheets

(56) References Cited

U.S. PATENT DOCUMENTS

| | | | |
|---|---|---|---|
| 2010/0122007 A1* | 5/2010 | Lahti | G06F 13/24 |
| | | | 710/262 |
| 2012/0124564 A1* | 5/2012 | Ringseth | G06F 8/45 |
| | | | 717/146 |
| 2012/0159444 A1* | 6/2012 | Agarwal | G06F 11/3624 |
| | | | 717/124 |
| 2013/0163764 A1 | 6/2013 | van den Berg et al. | |
| 2014/0358932 A1* | 12/2014 | Brown | G06F 16/2228 |
| | | | 707/741 |
| 2015/0067771 A1 | 3/2015 | Love et al. | |

OTHER PUBLICATIONS

"International Search Report and Written Opinion Issued in PCT Application No. PCT/US20/040390", dated Sep. 22, 2020, 12 Pages.

Ching, Hu, "Solving Today's Design Security Concerns", In White Paper of FPGA's, Jun. 29, 2010, 13 Pages.

Galinski, et al., "One-Time Programmable (OTP) Lock Circuit", Application as Filed in U.S. Appl. No. 16/054,866, filed Aug. 3, 2018, 40 Pages.

Suh, et al., "Efficient Memory Integrity Verification and Encryption for Secure Processors", In Proceedings of the 36th Annual IEEE/ACM International Symposium on Microarchitecture, Dec. 3, 2003, 15 Pages.

* cited by examiner

| SLOT | ATTRIBUTES FUNCTIONAL SIZE | ATTRIBUTES FUNCTIONAL START_ADDR | ATTRIBUTES FUNCTIONAL END_ADDR | ATTRIBUTES WRITE P1_W_ACCESS | ATTRIBUTES WRITE P2_W_ACCESS | ATTRIBUTES WRITE P3_W_ACCESS |
|---|---|---|---|---|---|---|
| STATE | 4 | 0 | 3 | 1 | 0 | 0 |
| PLL1 | 1 | 4 | 4 | 1 | 0 | 0 |
| PLL2 | 1 | 5 | 5 | 1 | 0 | 0 |
| ID | 4 | 6 | 9 | 1 | 0 | 0 |
| SW | 4 | 10 | 13 | 0 | 0 | 1 |
| KEY0 | 8 | 14 | 21 | 0 | 1 | 0 |
| KEY1 | 8 | 22 | 29 | 0 | 1 | 0 |
| KEY2 | 8 | 30 | 37 | 0 | 0 | 1 |
| KEY3 | 8 | 38 | 45 | 1 | 1 | 1 |
| TEST | 18 | 46 | 63 | 1 | 1 | 1 |

*FIG. 3A*

| SLOT (302) | ATTRIBUTES WRITE (324) | ATTRIBUTES READ (326) | ATTRIBUTES READ (328) | ATTRIBUTES READ (330) |
|---|---|---|---|---|
| | W_PERMITTED | P1_R_ACCESS | P2_R_ACCESS | P3_R_ACCESS |
| STATE | 1 | 0 | 0 | 0 |
| PLL1 | 1 | 1 | 1 | 0 |
| PLL2 | 1 | 1 | 1 | 0 |
| ID | ID_W_ALLOWED | 1 | 1 | 1 |
| SW | 1 | 0 | 0 | 1 |
| KEY0 | KEY0_W_ALLOWED | 0 | 0 | 0 |
| KEY1 | KEY1_W_ALLOWED | 0 | 0 | 0 |
| KEY2 | 1 | 1 | 0 | 1 |
| KEY3 | 1 | | 0 | 1 |
| TEST | TEST_W_ALLOWED | | 1 | 1 |

| SLOT 302 | ATTRIBUTES 332 READ R_PERMITTED | ATTRIBUTES 334 USAGE LOAD_PERMITTED | ATTRIBUTES 336 USAGE LOAD_TRIGGER | ATTRIBUTES 338 USAGE MULTI_DESTINATION | ATTRIBUTES 340 INTEGRITY ENCODING |
|---|---|---|---|---|---|
| STATE | 0 | 1 | 1 | 1 | 123 |
| PLL1 | 1 | 1 | PLL_READY | 1 | 0 |
| PLL2 | 1 | 1 | PLL_READY | 11 | 0 |
| ID | 1 | 1 | 1 | 1 | 0 |
| SW | 1 | 1 | 1 | 1 | 0 |
| KEY0 | 0 | KEY_VALID | 1 | 1 | 0 |
| KEY1 | 0 | KEY_VALID | 1 | 1 | 0 |
| KEY2 | KEY2_R_ALLOWED | 1 | 1 | 1 | 0 |
| KEY3 | KEY3_R_ALLOWED | 1 | 1 | 1 | 0 |
| TEST | 1 | 0 | NA | 1 | 0 |

| 302 | | 352 ATTRIBUTES | 354 ATTRIBUTES | 356 ATTRIBUTES | 358 ATTRIBUTES | 360 ATTRIBUTES | 362 ATTRIBUTES |
|---|---|---|---|---|---|---|---|
| SLOT | | INTEGRITY | INTEGRITY | INTEGRITY | INTEGRITY | INTEGRITY | INTEGRITY |
| | | ENCODING_ARCS | ECC | MAC | REDUNDANCY | BLANK_CHECK_BEFORE_W | GRANULARITY |
| STATE | | 12, 13, 23 | 0 | 0 | 0 | 0 | 1 |
| PLL1 | | NA | 0 | 0 | 1 | 0 | 0 |
| PLL2 | | NA | 0 | 0 | 1 | 0 | 0 |
| ID | | NA | 0 | 0 | 0 | 1 | 1 |
| SW | | NA | 1 | 0 | 0 | 1 | 0 |
| KEY0 | | NA | 1 | 1 | 0 | 1 | 1 |
| KEY1 | | NA | 1 | 1 | 0 | 1 | 1 |
| KEY2 | | NA | 1 | 0 | 0 | 1 | 1 |
| KEY3 | | NA | 1 | 0 | 0 | 1 | 1 |
| TEST | | NA | 0 | 0 | 0 | 0 | 0 |

USING A COMMON FUSE CONTROLLER HARDWARE DESIGN FOR DIFFERENT APPLICATIONS

BACKGROUND

A processing system, such as a system on a chip (SoC), is frequently packaged as an integrated circuit for use in devices, such as smart phones, tablets, digital cameras, virtual reality head-mounted displays, or mixed-reality head-mounted displays. A typical SoC may include at least one processor (e.g., a core), a memory (e.g., SRAM), clocking circuitry (e.g., PLLs), peripheral interfaces, other logic circuits, and various busses for interconnecting these logic circuits. To ensure secure computing, such an SoC may be required to ensure authenticity, integrity, and confidentiality.

SUMMARY

In one example, the present disclosure relates to a method, implemented by a processor, related to a first system on a chip (SoC) and a second SoC, different from the first SoC. The method may include specifying a first fuse map for the first SoC. The method may further include specifying a second fuse map for the second SoC. The method may further include using the processor, processing the first fuse map to generate a first hardware description language (HDL) file based on the first fuse map. The method may further include using the processor, processing the second fuse map to generate a second HDL file based on the second fuse map. The method may further include using the processor, compiling a common hardware state machine HDL file with the first HDL file to generate a first output file capturing behavior expressed in the first fuse map or compiling the common hardware state machine HDL file with the second HDL file to generate a second output file capturing behavior expressed in the second fuse map.

In another example, the present disclosure relates to a method, implemented by a processor, for generating hardware description for first a system on a chip (SoC) or a second SoC, different from the first SoC. The method may include specifying a first fuse map for the first SoC, where the first fuse map comprises a first plurality of fuse regions. The method may include specifying a second fuse map for the second SoC, where the second fuse map comprises a second plurality of fuse regions different from the first plurality of fuse regions. The method may include using the processor, processing the first fuse map to generate a first hardware description language (HDL) file corresponding to the first fuse map. The method may include using the processor, processing the second fuse map to generate a second HDL file corresponding to the second fuse map. The method may include using the processor, compiling a common hardware state machine HDL file with the first HDL file to generate a first output HDL file capturing behavior expressed in the first fuse map or compiling the common hardware state machine HDL file with the second HDL file to generate a second output HDL file capturing behavior expressed in the second fuse map. The method may include using the processor, compiling a common hardware state machine HDL file with the first HDL file to generate a first output HDL file capturing behavior expressed in the first fuse map or compiling the common hardware state machine HDL file with the second HDL file to generate a second output HDL file capturing behavior expressed in the second fuse map.

In another example, the present disclosure relates to a system, including a processor, for processing fuse regions related to a first system on a chip (SoC) and a second SoC, different from the first SoC. The system may be configured to receive a first fuse map for the first SoC. The system may further be configured to receive a second fuse map for the second SoC. The system may further be configured to using the processor, process the first fuse map to generate a first hardware description language (HDL) file based on the first fuse map. The system may further be configured to using the processor, process the second fuse map to generate a second HDL file based on the second fuse map. The system may further be configured to using the processor, compile a common hardware state machine HDL file with the first HDL file to generate a first output file capturing behavior expressed in the first fuse map or compile the common hardware state machine HDL file with the second HDL file to generate a second output file capturing behavior expressed in the second fuse map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 3A shows a portion of a fuse map in accordance with one example;

FIG. 3B shows another portion of a fuse map in accordance with one example;

FIG. 3C shows yet another portion of a fuse map in accordance with one example;

FIG. 3D shows yet another portion of a fuse map in accordance with one example;

DETAILED DESCRIPTION

Examples described in this disclosure relate to systems and methods for using a common fuse controller hardware design for different applications. Electronic security relies on authenticity, confidentiality and integrity of computing and communication among components in a system on a chip (SoC). To ensure electronic security, secrets themselves are required to have integrity and be authentic and confidential. Authenticity may relate to when and how secrets are programmed into the hardware. Confidentiality may relate to controlling who has direct and indirect access to those secrets. Integrity may relate to protecting the granularity of access, preventing any modifications and detecting any modifications.

Secrets in a secured hardware may need to have certain "attributes" defined and enforced in hardware through architecture, design, implementation, manufacturing and usage to maintain electronic security. Moreover, the secrets must persist in absence of power and hence they may be stored in fuses. Fuses may be implemented using any non-volatile memory. As an example, fuses may be implemented as a read-only-memory (ROM), an electrically-erasable and programmable read-only-memory (EEPROM), a one-time programmable (OTP) memory, a NAND flash, or other types of non-volatile memory A secured fuse region (also referred to as a fuse slot) may be a group of n-bit fuse words that all share the same security attribute values and are used as a unit to target the same functionality. Examples of fuse regions in secured hardware include Public ID, hardware configuration settings, software revision control, and secret keys.

Each fuse region may have a set of attributes. The attribute values may be fixed or dynamically assigned by a "trusted entity". Dynamic assignment provides flexibility during product development while maintaining security. A trusted entity is a hardware construct that has inherent or derived knowledge of state of the hardware and in certain state of the hardware; it is further assisted by secured authenticated software to support production or usage scenarios. The state of the hardware here refers to the various stages of a product (e.g., an SoC from manufacturing to shipment, such as silicon production, silicon testing, system production, system testing, and product delivered to the customer.

Figure 1:
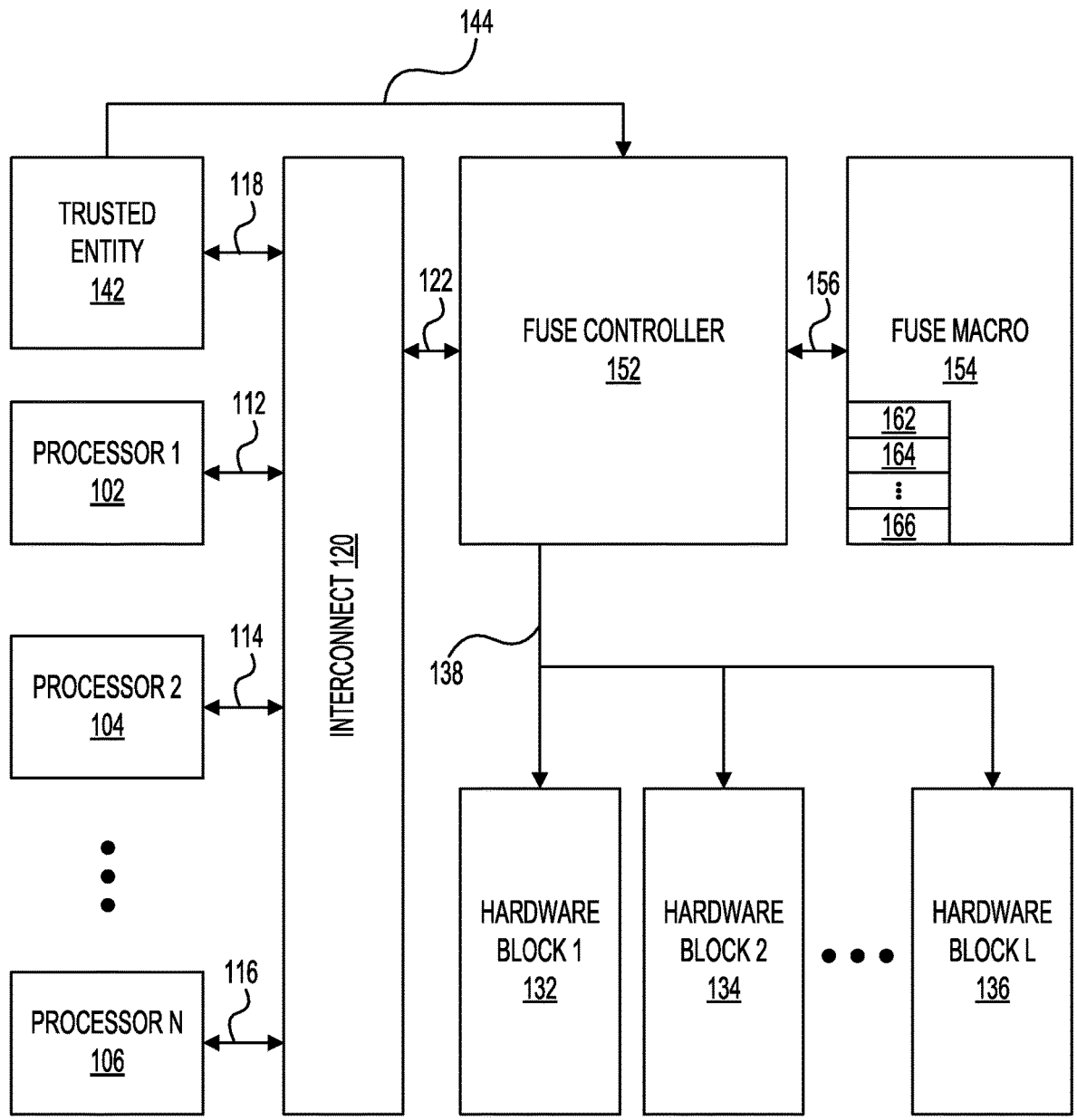
FIG. 1 is a diagram of a system on a chip (SoC) including a fuse controller and a fuse macro in accordance with one example.

FIG. 1 is a diagram of a system on a chip (SoC) 100 including a fuse controller 152 and a fuse macro 154 in accordance with one example. SoC 100 may include one or more processors, which may be processing cores. As an example, SoC 100 may include processor 1 102, processor 2 104, and processor N 106. SoC 100 may further include a trusted entity 142. An example trusted entity may be implemented as a hardware construct that has inherent or derived knowledge of state of the hardware and in certain state of the hardware. Trusted entity 142 may further be assisted by secured authenticated software to support production or usage scenarios. The processors and trusted entity 142 may be coupled to an interconnect 120. As an example, processor 1 102 may be coupled via bus 112 to interconnect 120; processor 2 104 may be coupled via bus 114 to interconnect 120; and processor N 106 may be coupled via bus 116 to interconnect 120. Trusted entity 142 may be coupled via bus 118 to interconnect 120. Fuse controller 152 may be coupled to interconnect 120 via bus 122 and thus allow the processors to communicate with fuse controller 152. Trusted entity 142 may have another bus connection 144 to fuse controller 152 to provide dynamic attribute signals in a secure manner to fuse controller 152.

With continued reference to FIG. 1, SoC 100 may further include various hardware blocks. As an example, SoC 100 may include hardware block 1 132, hardware block 2 134, and hardware block L 136. Hardware blocks may include hardware components, such as phase-locked loops (PLLs), memory controllers, interface blocks, or other functional blocks included in SoC 100. Fuse controller 152 may be coupled via bus 138 to hardware block 1 132, hardware block 2 134, and hardware block L 136.

Still referring to FIG. 1, fuse macro 154 may be coupled via bus 156 to fuse controller 152. Fuse macro 154 may include fuse regions 162, 164, and 166. Additional details concerning the content of such fuse regions are provided later. Fuse macro 154 may be implemented as a non-volatile memory. As an example, fuse macro 154 may be implemented as a read-only-memory (ROM), an electrically-erasable and programmable read-only-memory (EEPROM), a one-time programmable (OTP) memory, a NAND flash, or other types of non-volatile memory. In this example, each fuse region may include programmed fuse bits corresponding to the various components of SoC 100. Fuse controller 152 may access fuse bits during the initialization phase of SoC 100 and later when any of the processors issues a command to fuse controller 152. Fuse controller 152 may be configured to check if the requester is permitted to access the fuse for current state (e.g., manufacturing, testing, shipping, in the hands of a consumer, or end of life) of SoC 100. Fuse controller 152 may further be configured to read fuse bits from fuse macro 154 and program fuse bits into fuse macro 154. Although FIG. 1 shows SoC 100 as including a certain number/type of components arranged in a certain manner, SoC 100 may include additional or fewer and other types of components and these components may be arranged differently.

Figure 2:
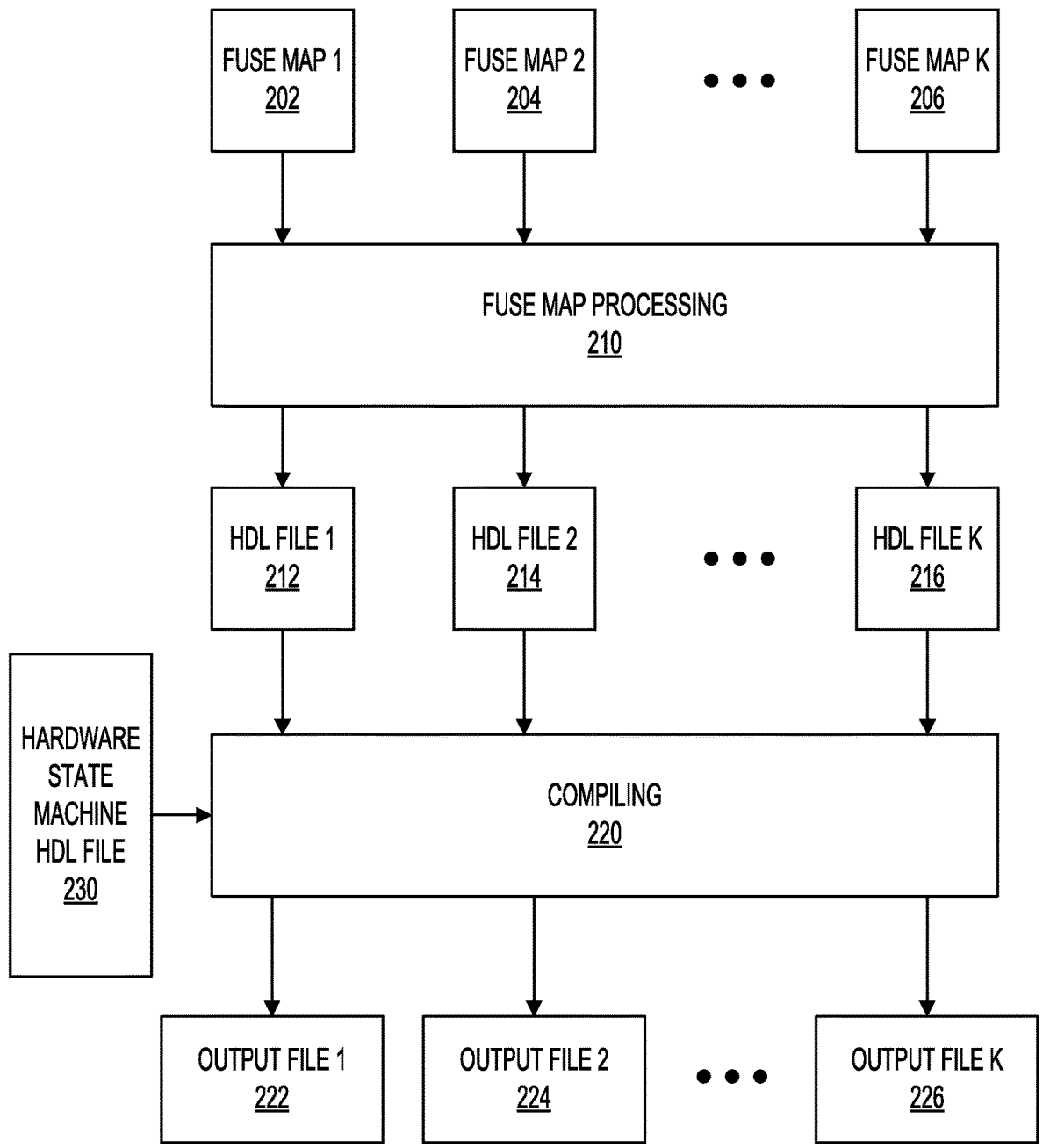
FIG. 2 shows a system environment for creating a fuse controller for a fuse macro in accordance with one example.

FIG. 2 shows a system environment 200 for creating a fuse controller for a fuse macro in accordance with one example. System environment 200 corresponds to the hardware design phase of SoC 100. In this phase, fuse controller corresponding to the fuse macro in SoC 100 may be created. System environment 200 shows a multiplicity of fuse maps that may correspond to different SoCs, including different versions of the same SoC. As an example, system environment 200 shows fuse map 1 202, fuse map 2 204, and fuse map K 206. The fuse maps may be files listing fuse regions and their attribute values. Table 1 below shows one example of attribute types, the requirement (e.g., authenticity, confidentiality, or integrity) the attribute type is aimed at, possible values for the attribute type, and a brief description.

TABLE 1

| Attribute Type | Required for | Value | Brief Description |
| --- | --- | --- | --- |
| Program permission | Authenticity, Confidentiality, Integrity | Dynamic signal or 1 | Whether the fuse region can be programmed in the current state of system. 0: Not allowed. 1: allowed. Dynamic signal is controlled by a trusted entity. |
| Read permission | Confidentiality | Dynamic signal or 0 | Whether the fuse region can be read in the current state of system. 0: Not allowed. 1: allowed. Dynamic signal is controlled by a trusted entity. |
| Load to compute | Confidentiality | Dynamic signal or 0 or 1 | Whether the fuse region can be used in hardware for compute. 0: Not allowed. 1: allowed. Dynamic signal is controlled by a trusted entity. |
| Load trigger | Authenticity | Dynamic signal or 1 | Wait for trigger to assert to 1 before the hardware can load the fuse region. If tied to 1, the hardware can load at any time. |
| Accessor 1 permission | Authenticity, Confidentiality, Integrity | Dynamic signal or 0 or 1 | Whether Accessor 1 can operate on this fuse region. 0: Not allowed. 1: allowed. Dynamic signal is controlled by a trusted entity and takes values of 0 or 1. |

TABLE 1-continued

| Attribute Type | Required for | Value | Brief Description |
| --- | --- | --- | --- |
| Accessor 2 permission | Authenticity, Confidentiality, Integrity | Dynamic signal or 0 or 1 | Whether Accessor 2 can operate on this fuse region. 0: Not allowed. 1: allowed. Dynamic signal is controlled by a trusted entity and takes values of 0 or 1. |
| Accessor n permission | Authenticity, Confidentiality, Integrity | Dynamic signal or 0 or 1 | Whether Accessor n can operate on this fuse region. 0: Not allowed. 1: allowed. Dynamic signal is controlled by a trusted entity and takes values of 0 or 1. |
| ECC | Integrity | 0 or 1 | Whether a given fuse region uses Error Correction Codes for security and reliability |
| Accessor granularity of access | Integrity | 0 or 1 | How can accessor access this fuse region 0: The fuse region contents are only addressed as a whole unit. 1: The fuse region contents are only addressed n-bits at a time. |

As an example, a fuse map may be created by assigning values to the attributes associated with the fuse region and arranging them in a sequence. Additional details of fuse regions that can be included in fuse maps are provided with respect to FIGS. 3A, 3B, 3C, and 3D. Any type of file or data structure that allows a parser to translate the fuse regions and their attributes into a hardware description language (HDL) may be used. As an example, fuse maps may correspond to spreadsheet files.

With continued reference to FIG. 2, fuse map processing 210 may include the use of a parsing tool including instructions, when executed by a processor, to convert the files containing fuse regions and their attributes into hardware description language files. As an example, fuse map processing 210 may include the use of a parser that may convert spreadsheet files into Verilog files, including define files. Table 2 shows an example of define statements included in a Verilog file for a secret key fuse region/slot.

TABLE 2

```
// "CPU0" accessor cannot operate on this secret key ever
'define Key0_Slot_CPU0_Allowed        0
// "CPU1" accessor can operate on this secret key
'define Key0_Slot_CPU1_Allowed        1
// No accessor can ever read the value of this secret key (secret can
only be used directly in compute hardware without its value being
known to any agent)
'define Key0_Slot_Read                0
// This key can only be programmed when a trusted entity allows it to
be programmed
'define Key0_Slot_Program             KEYPROG_EN
// The key can only be used in compute hardware if a trusted entity
allows (after it is programmed)
'define Key0_Slot_LOAD                KEY_IS _VALID
// The key is loaded into compute hardware when a trusted entity or
CPU1 triggers it
'define Key0_Slot_LOAD_TRIGGER        KEY_STORE_READY
// Any accessors or compute hardware cannot access this secret
partially, it is used as a whole only
'define Key0_Slot_word_acc            0
// This slot has ECC (error detection and correction codes). These
codes are computed based on value of secret being programmed and
programmed along with it. After programming, if the secret value was
ever altered through any tampering attack, the corresponding ECC
value (computed every time secret is used) will mismatch and the
attack will be known, and hence can be prevented.
'define Key0_Slot_ECC                 1
```

The output of fuse map processing 210 may be stored in corresponding hardware description language files. As an example, HDL file 1 212 may include hardware description corresponding to fuse map 1 202, HDL file 2 214 may include hardware description corresponding to fuse map 2 204, and HDL file K 216 may include hardware description corresponding to fuse map K 206. In one example, each of the HDL files may include register transfer language description of the fuse regions and their attributes. In addition, each of the HDL files may include text macros that may be resolved during compiling 220.

Still referring to FIG. 2, compiling 220 may include the use of a compiler (or a similar tool) to process any of the HDL files generated as part of fuse map processing with a common hardware state machine (e.g., hardware state machine HDL file 230). As an example, HDL file 1 212 may be compiled along with hardware state machine HDL file 230 to generate output file 1 222, HDL file 2 214 may be compiled along with hardware state machine HDL file 230 to generate output file 2 224, and HDL file K 216 may be compiled along with hardware state machine HDL file 230 to generate output file K 226. Thus, advantageously, attributes specified in fuse maps provide a construct that creates a vocabulary to define and implement a secure system with secrets stored in fuses. The fuse maps and their use in the manner described enables a language that can be spoken across product development from silicon conceptualization to the end consumer product. This eliminates any error in implementation by allowing the preservation of the original intent of the chip designer by defining each aspect of a secure fuse. In the absence of such a universal construct the aspects of security and intended fuse usage are often ambiguous, get missed during implementation or require excessive documentation to carry intent. Absence of a universal construct also means each project/product define and use their own lingo that are rarely compatible to each other and result in no or little reusability of hardware or software.

FIG. 3A shows portion of a fuse map 300 (shown in FIGS. 3A-D) in accordance with one example. Fuse map 300 may be processed as part of fuse map processing 210 of FIG. 2. Fuse map 300 shows a variety of attributes associated with fuse slots or fuse regions. Specific fuse maps for various controllers may include a subset (or other attributes) of the attributes shown in FIGS. 3A-3D. Column 302 of FIG. 3A shows the various fuse regions that may be specified as part of a fuse map. In this example, a fuse region (or slot) may be a group of fuse words (e.g., 32-bit words) that are all consecutive, share the same attribute values, target the same functionality, and get loaded together as a unit using the same signals and protocol. An example set of signals and protocol to load a fuse region to its destination may be Fuse Load Interface (FLI). Fuse region STATE may correspond to which state of the controller the attribute type corresponds to. As an example, the fuse region STATE may correspond to the various stages of a product (e.g., an SoC) from manufacturing to shipment, such as silicon production, silicon testing, system production, system testing, and product delivered to the customer. Fuse region PLL1 may correspond to a first phase locked loop (PLL) that may be included in an SoC. Fuse region PLL2 may correspond to a second PLL that may be included in the SoC. Fuse region ID may correspond to an SoC identifier, which may be a unique identifier for each SoC chip. Fuse region SW may correspond to software access to the fuse region. Fuse region KEY0 may correspond to a first security key. Fuse region KEY1 may correspond to a second security key. Fuse region KEY2 may correspond to a third security key. Fuse region KEY3 may correspond to a fourth security key. Fuse region TEST may correspond to attributes associated with the test stage of the SoC.

With continued reference to FIG. 3A, row 316 specifies the nature of the attribute. As an example, an attribute may relate to a functional aspect (e.g., PLL frequency calibration) of the fuse region (labeled as FUNCTIONAL), an attribute may relate to read or write access of the fuse region (labeled as READ or WRITE), an attribute may relate to the intended usage of the fuse region (labeled as USAGE), and another attribute may relate to the integrity mechanism associated with the fuse region (labeled as INTEGRITY).

Still referring to FIG. 3A, column 304 indicates that the attribute provides the size of the fuse region in words or another measure of size, e.g., bits or bytes. Column 306 provides an indication of the start address (labeled START_ADDR) associated with the fuse region Column 308 provides an indication of the end address (labeled END_ADDR). For any software to access the fuses, it will need to provide a start address and an end address. Table 3 provides a brief description of attributes labeled as P1_W_ACCESS (column 310), P2_W_ACCESS (column 312), and P3_W_ACCESS (column 314). Each of columns 310, 312, and 314 shows possible values for respective attributes.

TABLE 3

| FUSE SLOT | BRIEF DESCRIPTION |
| --- | --- |
| P1_W_ACCESS | Can Processor 1 write to this slot: 0 = Never. 1 = Always. <signal_name> = If <signal_name> is high |
| P2_W_ACCESS | Can Processor 2 write to this slot: 0 = Never. 1 = Always. <signal_name> = If <signal_name> is high |
| P3_W_ACCESS | Can Processor 3 write to this slot: 0 = Never. 1 = Always. <signal_name> = If <signal_name> is high |

FIG. 3B shows another portion of a fuse map in accordance with one example. The column(s) or row(s) that serve the same purpose as described with respect to FIG. 3A are not described again. Table 4 provides a brief description of attributes labeled as W_PERMITTED (column 324), P1_R_ACCESS (column 326), P2_R_ACCESS (column 328), and P3_R_ACCESS (column 330). Each of columns 324, 326, 328, and 330 shows possible values for respective attributes.

TABLE 4

| FUSE SLOT | BRIEF DESCRIPTION |
| --- | --- |
| W_PERMITTED | Is this slot currently writable: 0 = Never. 1 = Always. <signal_name> = If <signal_name> is high |
| P1_R_ACCESS | Can Processor 1 read this slot: 0 = Never. 1 = Always. <signal_name> = If <signal_name> is high |
| P2_R_ACCESS | Can Processor 2 read this slot: 0 = Never. 1 = Always. <signal_name> = If <signal_name> is high |
| P3_R_ACCESS | Can Processor 3 read this slot: 0 = Never. 1 = Always. <signal_name> = If <signal_name> is high |

FIG. 3C shows yet another portion of a fuse map in accordance with one example. The column(s) or row(s) that serve the same purpose as described with respect to FIG. 3A are not described again. Table 5 provides a brief description of attributes labeled as R_PERMITTED (column 332), LOAD_PERMITTED (column 334), LOAD_TRIGGER (column 336), MULTI_DESTINATION (column 338), and ENCODING (column 340). Each of columns 332, 334, 336, 338, and 340 shows possible values for respective attributes.

TABLE 5

| FUSE SLOT | BRIEF DESCRIPTION |
| --- | --- |
| R_PERMITTED | Is this slot currently readable: 0 = Never. 1 = Always. <signal_name> = If <signal_name> is high |
| LOAD_PERMITTED | Is this slot loaded to a destination by hardware |
| LOAD_TRIGGER | When is the slot loaded to a destination by hardware: 0 = Never. 1 = Always. <signal_name> = If <signal_name> is high |
| MULTI_DESTINATION | Destination for fuse load. 1 = Default destination. <nbit_string> = To up to n destinations out of possible n destinations. As an example, 11 means destination 1 and 2, 101 means destination 1 and 3 |
| ENCODING | The slot is accessed indirectly using encodings. 0 = No encoding. <number_string> = state encodings. As an example, 123 means slot is encoded as 1 or 2 or 3 and no other value |

FIG. 3D shows yet another portion of a fuse map in accordance with one example. The column(s) or row(s) that serve the same purpose as described with respect to FIG. 3A are not described again. Table 6 below provides a brief description of attributes labeled as ENCODING_ARCS (column 352), ECC (column 354), MAC (column 356), REDUNDANCY (column 358), BLANK_CHECK_BEFORE_W (column 360), and GRANULARITY (column 362). Each of columns 352, 354, 356, 358, 360, and 362 shows possible values for respective attributes.

TABLE 6

| FUSE SLOT | BRIEF DESCRIPTION |
| --- | --- |
| ENCODING_ARCS | The encoded states can only transition in allowed arcs. As an example, 12 means encoded state can go from 1 to 2 |
| ECC | The data value is integrity protected by an Error-Correcting Code (ECC) |
| MAC | The data value is integrity protected by a secret key using Message Authentication Code |
| REDUNDANCY | The value is stored in triple redundant format. As examples: 0 is stored as 000; 1 is stored as 111; 011 is read as 1; and 001 is read as 0 |
| BLANK_CHECK_BEFORE_W | Programming is only allowed if the entire slot is blank (e.g., each of the n-bits with 0 value only) |
| GRANULARITY | 1: The slot is only accessed as a whole using slot start address. 0: The slot is accessed by an individual data word address within the slot |

Although FIGS. 3A-3D show a certain number and type of attributes, additional or fewer numbers and other types of attributes may be included. In addition, the values of the attributes are merely shown as example values and other values expressed in a different format may be used. Moreover, although Tables 3-6 indicate certain values and signal levels associated with these attributes, other values and signal levels may also be used.

Figure 4:
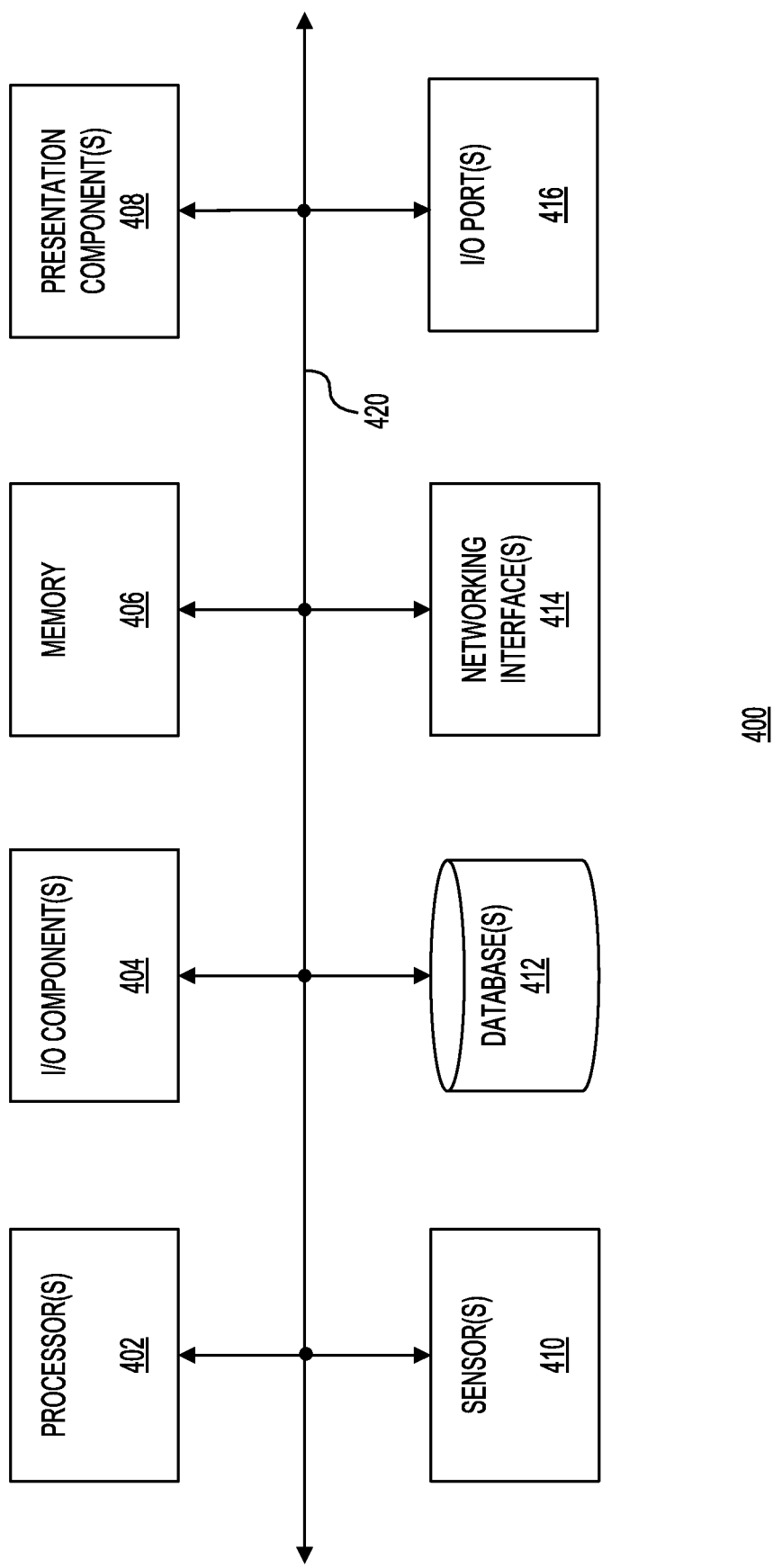
FIG. 4 shows a system for generating hardware description for a fuse macro in accordance with one example.

FIG. 4 shows a system 400 for generating hardware description for a fuse macro in accordance with one example. System 400 may include a processor(s) 402, I/O component(s) 404, memory 406, presentation component(s) 408, sensors 410, database(s) 412, networking interfaces 414, and I/O port(s) 416, which may be interconnected via bus 420. Processor(s) 402 may execute instructions stored in memory 406. I/O component(s) 404 may include components such as a keyboard, a mouse, a voice recognition processor, or touch screens. Memory 406 may be any combination of non-volatile storage or volatile storage (e.g., flash memory, DRAM, SRAM, or other types of memories). Presentation component(s) 408 may include displays, holographic devices, or other presentation devices. Displays may be any type of display, such as LCD, LED, or other types of display. Sensors 410 may include telemetry or other types of sensors configured to detect, and/or receive, information (e.g., collected data).

Still referring to FIG. 4, database 412 may be used to store any of the data relating to code base being processed for use with fuse macros for the various SoCs. Database 412 may be implemented as a collection of distributed databases or as a single database. Network interfaces 414 may include communication interfaces, such as Ethernet, cellular radio, Bluetooth radio, UWB radio, or other types of wireless or wired communication interfaces. I/O port(s) 416 may include Ethernet ports, Fiber-optic ports, wireless ports, or other communication ports. Although FIG. 4 shows system 400 as including a certain number of components arranged and coupled in a certain way, it may include fewer or additional components arranged and coupled differently. In addition, the functionality associated with system 400 may be distributed, as needed.

Figure 5:
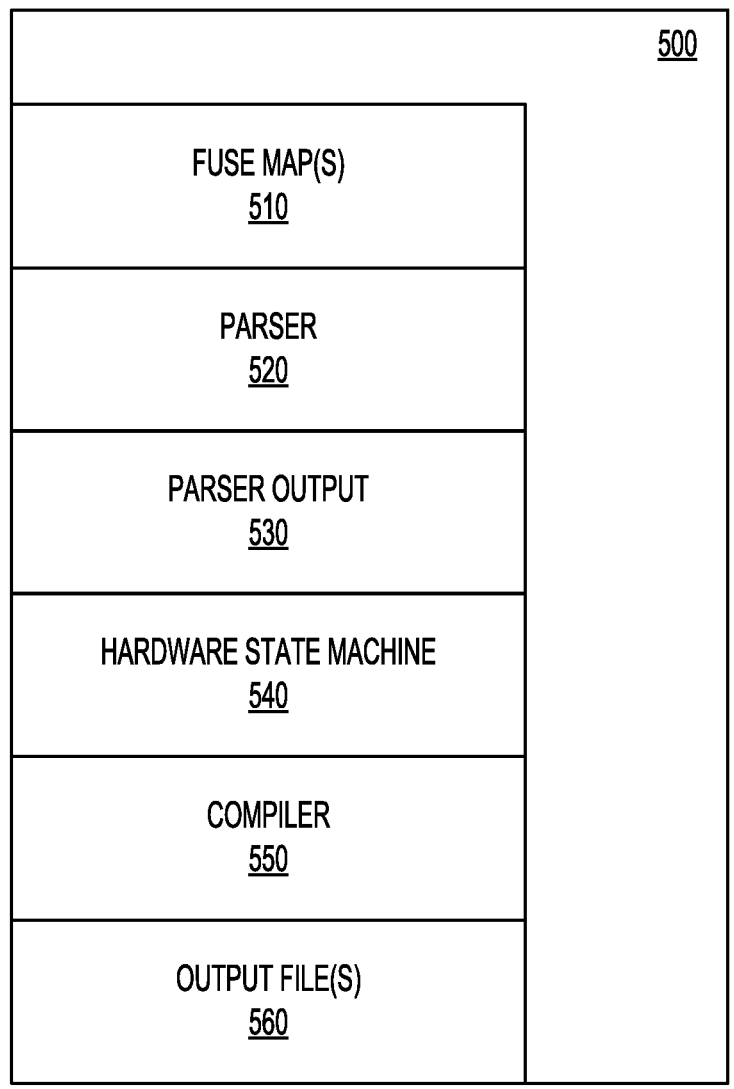
FIG. 5 shows modules and files stored in a memory in accordance with one example.

FIG. 5 shows modules and files stored in a memory 500 (e.g., corresponding to memory 406 of FIG. 4) in accordance with one example. Fuse map(s) 510 may be files listing fuse regions and their attributes. Example information that may be included in fuse maps is described earlier, including with respect to FIGS. 3A-3D. Parser 520 may include instructions, libraries, API, and other code configured to parse fuse map(s) to generate corresponding HDL file(s) by processing the fuse map(s) 510. Parser 520 may include a script file that may call other scripts to provide the functionality associated with parsing. As an example, Table 7 below shows an example script.

TABLE 7

```
Input_file=../../fuse_map/dont_touch_fuse_map_for_parsing.csv
Inter_file=./include_gfc_uf.txt
Output_file=../defines.v
if [ -f $Input_file ]
then
   csv_timestamp='date -r $Input_file "+%F %T"'
   echo "*********************************************************"
   echo "Parsing csv last modified on $csv_timestamp"
   echo "*********************************************************"
   echo "Deleting (if any) existing include_gfc*.txt files"
   rm -f $Output_file $Inter_file
   python "./csv_parser.py" "$Input_file" > $Inter_file
   python "./format_defines.py" "$Inter_file" > $Output_file
# rm $Inter_file
   echo "//Created using fuse_map.csv modified on $csv_timestamp" >> $Output_file
   echo "*********************************************************"
   echo "Showing last few lines of newly generated include file"
   echo "*********************************************************"
   chmod 444 $Output_file
   tail -20 $Output_file
else
   echo "File $Input_file does not exist."
fi
```

With continued reference to FIG. 5, the example script shown in Table 7 may call two python scripts: one for parsing the fuse map(s) and the other for ensuring proper formatting. Table 8 shows an example of the parsing script, which may be included as part of parser 520. Table 9 shows an example of the formatting script, which may be included as part of parser 520.

TABLE 8

```
import sys
import csv
with open(sys.argv[1]) as csv_file:
    csv_reader = csv.reader(csv_file, delimiter=',')
    line_count = 0
    for row in csv_reader:
        if line_count == 2:
            header_row = row
            line_count += 1
            print '#####README_BEGIN#####',
            print ''
        elif line_count == 3:
            column_count = 0
            for col in row:
                print '#',
                print(header_row[column_count]),
                sys.stdout.softspace=False
                print '\t',
                print(row[column_count])
                sys.stdout.softspace=False
                column_count += 1
            print '#####README_END#####',
            print ''
            print ''
            line_count += 1
        elif line_count > 3:
            column_count = 0
            for col in row:
                if column_count == 0:
                    column_count += 1
                    continue
                print '`define',
                print(row[0]),
                sys.stdout.softspace=False
                print '_',
                sys.stdout.softspace=False
                print(header_row[0]),
                sys.stdout.softspace=False
                print '_',
                sys.stdout.softspace=False
                print(header_row[column_count])
                sys.stdout.softspace=False
                print '\t',
                if column_count == 1:
                    print '5\'d',
                    sys.stdout.softspace=False
                if column_count == 2:
                    print '6\'h',
                    sys.stdout.softspace=False
                if column_count == 3:
                    print '6\'h',
                    sys.stdout.softspace=False
                print(row[column_count])
                # print(f' `define
{row[0]}_{header_row[0]}_{header_row[1]} \t\t {row[1]}')
                column_count += 1
                print ''
                line_count += 1
        else:
            line_count += 1
            continue
```

TABLE 9

```
import datetime
import sys
lines = [line.rstrip('\n') for line in open(sys.argv[1])]
line_counter = 0
```

TABLE 9-continued

```
        for line in lines:
            # print '%50s' % line
            line_counter += 1
            words = line.split( )
            cnt = 0
            if line_counter <25:
                for word in words:
                    if cnt == 1:
                        print '{0: <24}'.format(word),
                    else:
                        print word,
                    cnt += 1
                print ''
            else:
                for word in words:
                    if cnt == 1:
                        print '{0: <35}'.format(word),
                    else:
                        print word,
                    cnt += 1
                print ''
        #print '//Created on %s' % datetime.datetime.now( )
```

Parser 520 may process the fuse map(s) using the scripts and code shown in tables 7-9. Parser 520 may generate parser output 530. In this example, parser output 530 may include hardware description files including define statements. Table 10 shows a parser output file that is generated based on the use of example code shown in tables 7-9.

TABLE 10

| | |
|---|---|
| 'define State_Slot_Size | 5'd4 |
| 'define State_Slot_Start_Addr | 6'h0 |
| 'define State_Slot_End_Addr | 6'h3 |
| 'define State_Slot_P1_W_Access | 1 |
| 'define State_Slot_P2_W_Access | 0 |
| 'define State_Slot_P3_W_Access | 0 |
| 'define State_Slot_W_permitted | 1 |
| 'define State_Slot_P1_R_Access | 0 |
| 'define State_Slot_P2_R_Access | 0 |
| 'define State_Slot_P3_R_Access | 0 |
| 'define State_Slot_R_permitted | 0 |
| 'define State_Slot_Load_permitted | 1 |
| 'define State_Slot_Load_trigger | 1 |
| 'define State_Slot_Multi_destination | 1 |
| 'define State_Slot_Encoding | 123 |
| 'define State_Slot_Encoding_arcs | 12, 13, 23 |
| 'define State_Slot_ECC | 0 |
| 'define State_Slot_MAC | 0 |
| 'define State_Slot_Redundancy | 0 |
| 'define State_Slot_Blank_Check_Before_W | 0 |
| 'define State_Slot_Granularity | 1 |
| 'define PLL1_Slot_Size | 5'd1 |
| 'define PLL1_Slot_Start_Addr | 6'h4 |
| 'define PLL1_Slot_End_Addr | 6'h4 |
| 'define PLL1_Slot_P1_W_Access | 1 |
| 'define PLL1_Slot_P2_W_Access | 0 |
| 'define PLL1_Slot_P3_W_Access | 0 |
| 'define PLL1_Slot_W_permitted | 1 |
| 'define PLL1_Slot_P1_R_Access | 1 |
| 'define PLL1_Slot_P2_R_Access | 1 |
| 'define PLL1_Slot_P3_R_Access | 0 |
| 'define PLL1_Slot_R_permitted | 1 |
| 'define PLL1_Slot_Load_permitted | 1 |
| 'define PLL1_Slot_Load_trigger | pll_ready |
| 'define PLL1_Slot_Multi_destination | 1 |
| 'define PLL1_Slot_Encoding | 0 |
| 'define PLL1_Slot_Encoding_arcs | NA |
| 'define PLL1_Slot_ECC | 0 |
| 'define PLL1_Slot_MAC | 0 |
| 'define PLL1_Slot_Redundancy | 1 |
| 'define PLL1_Slot_Blank_Check_Before_W | 0 |
| 'define PLL1_Slot_Granularity | 0 |
| 'define PLL2_Slot_Size | 5'd1 |
| 'define PLL2_Slot_Start_Addr | 6'h5 |
| 'define PLL2_Slot_End_Addr | 6'h5 |

TABLE 10-continued

| | |
|---|---|
| 'define PLL2_Slot_P1_W_Access | 1 |
| 'define PLL2_Slot_P2_W_Access | 0 |
| 'define PLL2_Slot_P3_W_Access | 0 |
| 'define PLL2_Slot_W_permitted | 1 |
| 'define PLL2_Slot_P1_R_Access | 1 |
| 'define PLL2_Slot_P2_R_Access | 1 |
| 'define PLL2_Slot_P3_R_Access | 0 |
| 'define PLL2_Slot_R_permitted | 1 |
| 'define PLL2_Slot_Load_permitted | 1 |
| 'define PLL2_Slot_Load_trigger | pll_ready |
| 'define PLL2_Slot_Multi_destination | 11 |
| 'define PLL2_Slot_Encoding | 0 |
| 'define PLL2_Slot_Encoding_arcs | NA |
| 'define PLL2_Slot_ECC | 0 |
| 'define PLL2_Slot_MAC | 0 |
| 'define PLL2_Slot_Redundancy | 1 |
| 'define PLL2_Slot_Blank_Check_Before_W | 0 |
| 'define PLL2_Slot_Granularity | 0 |
| 'define ID_Slot_Size | 5'd4 |
| 'define ID_Slot_Start_Addr | 6'h6 |
| 'define ID_Slot_End_Addr | 6'h9 |
| 'define ID_Slot_P1_W_Access | 1 |
| 'define ID_Slot_P2_W_Access | 0 |
| 'define ID_Slot_P3_W_Access | 0 |
| 'define ID_Slot_W_permitted | ID_w_allowed |
| 'define ID_Slot_P1_R_Access | 1 |
| 'define ID_Slot_P2_R_Access | 1 |
| 'define ID_Slot_P3_R_Access | 1 |
| 'define ID_Slot_R_permitted | 1 |
| 'define ID_Slot_Load_permitted | 1 |
| 'define ID_Slot_Load_trigger | 1 |
| 'define ID_Slot_Multi_destination | 1 |
| 'define ID_Slot_Encoding | 0 |
| 'define ID_Slot_Encoding_arcs | NA |
| 'define ID_Slot_ECC | 0 |
| 'define ID_Slot_MAC | 0 |
| 'define ID_Slot_Redundancy | 0 |
| 'define ID_Slot_Blank_Check_Before_W | 1 |
| 'define ID_Slot_Granularity | 1 |
| 'define SW_Slot_Size | 5'd4 |
| 'define SW_Slot_Start_Addr | 6'h10 |
| 'define SW_Slot_End_Addr | 6'h13 |
| 'define SW_Slot_P1_W_Access | 1 |
| 'define SW_Slot_P2_W_Access | 0 |
| 'define SW_Slot_P3_W_Access | 1 |
| 'define SW_Slot_W_permitted | 1 |
| 'define SW_Slot_P1_R_Access | 1 |
| 'define SW_Slot_P2_R_Access | 1 |
| 'define SW_Slot_P3_R_Access | 1 |
| 'define SW_Slot_R_permitted | 1 |
| 'define SW_Slot_Load_permitted | 1 |
| 'define SW_Slot_Load_trigger | 1 |
| 'define SW_Slot_Multi_destination | 1 |
| 'define SW_Slot_Encoding | 0 |
| 'define SW_Slot_Encoding_arcs | NA |
| 'define SW_Slot_ECC | 0 |
| 'define SW_Slot_MAC | 0 |
| 'define SW_Slot_Redundancy | 0 |
| 'define SW_Slot_Blank_Check_Before_W | 0 |
| 'define SW_Slot_Granularity | 0 |
| 'define Key0_Slot_Size | 5'd8 |
| 'define Key0_Slot_Start_Addr | 6'h14 |
| 'define Key0_Slot_End_Addr | 6'h21 |
| 'define Key0_Slot_P1_W_Access | 0 |
| 'define Key0_Slot_P2_W_Access | 1 |
| 'define Key0_Slot_P3_W_Access | 0 |
| 'define Key0_Slot_W_permitted | key0_w_allowed |
| 'define Key0_Slot_P1_R_Access | 0 |
| 'define Key0_Slot_P2_R_Access | 0 |
| 'define Key0_Slot_P3_R_Access | 0 |
| 'define Key0_Slot_R_permitted | 0 |
| 'define Key0_Slot_Load_permitted | key_valid |
| 'define Key0_Slot_Load_trigger | 1 |
| 'define Key0_Slot_Multi_destination | 1 |
| 'define Key0_Slot_Encoding | 0 |
| 'define Key0_Slot_Encoding_arcs | NA |
| 'define Key0_Slot_ECC | 1 |
| 'define Key0_Slot_MAC | 0 |
| 'define Key0_Slot_Redundancy | 0 |
| 'define Key0_Slot_Blank_Check_Before_W | 1 |

TABLE 10-continued

| | |
|---|---|
| `define Key0_Slot_Granularity | 1 |
| `define Key1_Slot_Size | 5'd8 |
| `define Key1_Slot_Start_Addr | 6'h22 |
| `define Key1_Slot_End_Addr | 6'h29 |
| `define Key1_Slot_P1_W_Access | 0 |
| `define Key1_Slot_P2_W_Access | 1 |
| `define Key1_Slot_P3_W_Access | 0 |
| `define Key1_Slot_W_permitted | key1_w_allowed |
| `define Key1_Slot_P1_R_Access | 0 |
| `define Key1_Slot_P2_R_Access | 0 |
| `define Key1_Slot_P3_R_Access | 0 |
| `define Key1_Slot_R_permitted | 0 |
| `define Key1_Slot_Load_permitted | key_valid |
| `define Key1_Slot_Load_trigger | 1 |
| `define Key1_Slot_Multi_destination | 1 |
| `define Key1_Slot_Encoding | 0 |
| `define Key1_Slot_Encoding_arcs | NA |
| `define Key1_Slot_ECC | 1 |
| `define Key1_Slot_MAC | 0 |
| `define Key1_Slot_Redundancy | 0 |
| `define Key1_Slot_Blank_Check_Before_W | 1 |
| `define Key1_Slot_Granularity | 1 |
| `define Key2_Slot_Size | 5'd8 |
| `define Key2_Slot_Start_Addr | 6'h30 |
| `define Key2_Slot_End_Addr | 6'h37 |
| `define Key2_Slot_P1_W_Access | 0 |
| `define Key2_Slot_P2_W_Access | 0 |
| `define Key2_Slot_P3_W_Access | 1 |
| `define Key2_Slot_W_permitted | 1 |
| `define Key2_Slot_P1_R_Access | 0 |
| `define Key2_Slot_P2_R_Access | 0 |
| `define Key2_Slot_P3_R_Access | 1 |
| `define Key2_Slot_R_permitted | key2_r_allowed |
| `define Key2_Slot_Load_permitted | 1 |
| `define Key2_Slot_Load_trigger | 1 |
| `define Key2_Slot_Multi_destination | 1 |
| `define Key2_Slot_Encoding | 0 |
| `define Key2_Slot_Encoding_arcs | NA |
| `define Key2_Slot_ECC | 1 |
| `define Key2_Slot_MAC | 1 |
| `define Key2_Slot_Redundancy | 0 |
| `define Key2_Slot_Blank_Check_Before_W | 1 |
| `define Key2_Slot_Granularity | 1 |
| `define Key3_Slot_Size | 5'd8 |
| `define Key3_Slot_Start_Addr | 6'h38 |
| `define Key3_Slot_End_Addr | 6'h45 |
| `define Key3_Slot_P1_W_Access | 0 |
| `define Key3_Slot_P2_W_Access | 0 |
| `define Key3_Slot_P3_W_Access | 1 |
| `define Key3_Slot_W_permitted | 1 |
| `define Key3_Slot_P1_R_Access | 0 |
| `define Key3_Slot_P2_R_Access | 0 |
| `define Key3_Slot_P3_R_Access | 1 |
| `define Key3_Slot_R_permitted | key3_r_allowed |
| `define Key3_Slot_Load_permitted | 1 |
| `define Key3_Slot_Load_trigger | 1 |
| `define Key3_Slot_Multi_destination | 1 |
| `define Key3_Slot_Encoding | 0 |
| `define Key3_Slot_Encoding_arcs | NA |
| `define Key3_Slot_ECC | 1 |
| `define Key3_Slot_MAC | 1 |
| `define Key3_Slot_Redundancy | 0 |
| `define Key3_Slot_Blank_Check_Before_W | 1 |
| `define Key3_Slot_Granularity | 1 |
| `define Test_Slot_Size | 5'd18 |
| `define Test_Slot_Start_Addr | 6'h46 |
| `define Test_Slot_End_Addr | 6'h63 |
| `define Test_Slot_P1_W_Access | 1 |
| `define Test_Slot_P2_W_Access | 1 |
| `define Test_Slot_P3_W_Access | 1 |
| `define Test_Slot_W_permitted | test_w_allowed |
| `define Test_Slot_P1_R_Access | 1 |
| `define Test_Slot_P2_R_Access | 1 |
| `define Test_Slot_P3_R_Access | 1 |
| `define Test_Slot_R_permitted | 1 |
| `define Test_Slot_Load_permitted | 0 |
| `define Test_Slot_Load_trigger | NA |
| `define Test_Slot_Multi_destination | 1 |
| `define Test_Slot_Encoding | 0 |
| `define Test_Slot_Encoding_arcs | NA |
| `define Test_Slot_ECC | 0 |
| `define Test_Slot_MAC | 0 |
| `define Test_Slot_Redundancy | 0 |
| `define Test_Slot_Blank_Check_Before_W | 0 |
| `define Test_Slot_Granularity | 0 |

In terms of the formatting of the information in Table 10, certain variables, such as identifiers, start addresses, end addresses, and slot sizes are expressed in a format that includes information concerning the width in terms of the number of bits in the variable (e.g., 5 or 6), whether the variable is decimal (d), hexadecimal (h), or binary (b), and the actual value of the variable. Thus, "define ID_Slot_Size 5'd4" means that the width of this variable (e.g., SoC identifier) is five bits and it is a decimal number, whose value is 00100.

With continued reference to FIG. 5, as explained earlier, memory 500 may further include hardware state machine 540. In one example, hardware state machine 540 may be a hardware state machine expressed in a hardware description language, such as Verilog. As described earlier, hardware state machine 540 may be compiled along with the HDL file corresponding to a fuse map to generate output that may specify hardware description for a fuse macro with an SoC. The example hardware state machine 540 has an instruction line that states: 'include "defines.v". During compiling, this instruction is processed by searching for the right defines.v file for a particular SoC that is being processed.

Before executing any commands, hardware state machine 540 may perform validity checks with respect to both the current state of the SoC and the requester. These checks may correspond to enforcing authenticity, confidentiality, or integrity of the fuse regions. Thus, in general, hardware state machine 540 can be programmed to ensure compliance with any of the attribute types described in Table 1. As an example, for both program operations and read operations associated with a fuse region, hardware state machine 540 may determine whether the fuse region can be programmed or read in the current state (e.g., manufacturing, testing, shipping, in the hands of a consumer, or end of life). The determination may be based on both static values (e.g., 0: not allowed, 1: allowed) or dynamic signals controlled by a trusted entity. Table 11 shows example instructions corresponding to hardware state machine 540. As shown in Table 11, the instructions corresponding to the remark: "//Command validity: Allowed in current state" may check for the validity in the current state. Further, as shown in Table 11, the instructions corresponding to the remark: "//Command validity: Allowed by the requester" may check for the validity of the requester.

TABLE 11

```
'include "defines.v"
module sm (
//Pervasive signals
    input wire          clk,
    input wire          rst,
    input wire [7:0]    cmd,
    input wire [7:0]    requester_id,
    input wire          pll_ready,
    input wire          ID_W_permitted,
    input wire          key0_W_permitted,
    input wire          key2_R_permitted);
wire slot_is_pll = (apb_cmd_address >= 'PLL_Slot_Start_Address) &
(apb_cmd_address <= 'PLL_Slot_End_Address);
wire slot_is_id          = (apb_cmd_address ==
```

TABLE 11-continued

```
'ID_Slot_Start_Address);
wire slot_is_key0           = (apb_cmd_address ==
'Key0_Slot_Start_Address);
wire slot_is_key2           = (apb_cmd_address ==
'Key2_Slot_Start_Address);
//Command validity: Allowed in current state
wire action_is_permitted =
                            ((cmd=='write_command) &
'PLL_Slot_W_permitted & slot_is_pll) |
                            ((cmd=='write_command) &
'ID_Slot_W_permitted & slot_is_id) |
                            ((cmd=='write_command) &
'Key0_Slot_W_permitted & slot_is_key0) |
                            ((cmd=='write_command) &
'Key2_Slot_W_permitted & slot_is_key2) |
                            ((cmd=='read_command) &
'PLL_Slot_R_permitted & slot_is_pll) |
                            ((cmd=='read_command) & '
ID_Slot_R_permitted & slot_is_id) |
                            ((cmd=='read_command) &
'Key0_Slot_R_permitted & slot_is_key0) |
                            ((cmd=='read_command) &
'Key2_Slot_R_permitted & slot_is_key2);
//Command validity: Allowed by the requester
wire pll_requester_check    =slot_is_pll & (
                            ((requester_id == 'ID_p1) &
(cmd=='read_command & 'PLL_Slot_P1_R_Access) |
                            ((requester_id == 'ID_p1) &
(cmd=='write_command) & 'PLL_Slot_P1_W_Access) |
                            ((requester_id == 'ID_p2) &
(cmd=='read_command) & 'PLL_Slot_P2_R_Access) |
                            ((requester_id == 'ID_p2) &
(cmd=='write_command) & 'PLL_Slot_P2_W_Access);
wire id_reqester_check      = slot_is_id & (
                            ((requester_id == 'ID_p1) &
(cmd=='read_command) & 'ID_Slot_P1_R_Access) |
                            ((requester_id == 'ID_p1) &
(cmd=='write_command) & 'ID_Slot_P1_W_Access) |
                            ((requester_id == 'ID_p2) &
(cmd=='read_command) & 'ID_Slot_P2_R_Access) |
                            ((requester_id == 'ID_p2) &
(cmd=='write_command) & 'ID_Slot_P2_W_Access);
wire key0_reqester_check    = slot_is_pll & (
                            ((requester_id == 'ID_p1) &
(cmd=='read_command) & 'Key0_Slot_P1_R_Access) |
                            ((requester_id == 'ID_p1) &
(cmd=='write_command) & 'Key0_Slot_P1_W_Access) |
                            ((requester_id == 'ID_p2) &
(cmd=='read_command) & 'Key0_Slot_P2_R_Access) |
                            ((requester_id == 'ID_p2) &
(cmd=='write_command) & 'Key0_Slot_P2_W_Access);
wire key1_reqester_check    = slot_is_pll & (
                            ((requester_id == 'ID_p1) &
(cmd=='read_command) & 'Key2_Slot_P1_R_Access) |
                            ((requester_id == 'ID_p1) &
(cmd=='write_command) & 'Key2_Slot_P1_W_Access) |
                            ((requester_id == 'ID_p2) &
(cmd=='read_command) & 'Key2_Slot_P2_R_Access) |
                            ((requester_id == 'ID_p2) &
(cmd=='write_command) & 'Key2_Slot_P2_W_Access);
wire requester_check = pll_reqester_check | id_reqester_check |
key0_reqester_check | key1_reqester_check;
//Combining the above two checks
wire cmd_valid              = action_is_permitted & requester_check;
//State machine
always @ (*) begin
case(curr_state)
  LOAD_PLL: begin
    if (~'PLL_Slot_Load_permitted)
      next_state = LOAD_ID;
    else if (~'PLL_Slot_Load_trigger)
      next_state = curr_state;
    else if ('PLL_Slot_Multi_destination == 1)
      <load PLL to default destination 0>
    else begin
      if ('PLL_Slot_Multi_destination && 3'b001 == 3'b001)
        <load PLL to destination 0>
      if ('PLL_Slot_Multi_destination && 3'b010 == 3'b010)
        <load PLL to destination 1>
      if ('PLL_Slot_Multi_destination && 3'b100 == 3'b100)
        <load PLL to destination 2>
      next_state = LOAD_ID;
    end
  end
  LOAD_ID: begin
    if (~'ID_Slot_Load_permitted)
      next_state = LOAD_KEY0;
    else if (~'ID_Slot_Load_trigger)
      next_state = curr_state;
    else if ('ID_Slot_Multi_destination == 1)
      <load ID to default destination 0>
    else begin
      if ('ID_Slot_Multi_destination && 3'b001 == 3'b001)
        <load ID to destination 0>
      if ('ID_Slot_Multi_destination && 3'b010 == 3'b010)
        <load ID to destination 1>
      if ('ID_Slot_Multi_destination && 3'b100 == 3'b100)
        <load ID to destination 2>
      next_state = LOAD_KEY0;
    end
  end
  LOAD_KEY0: begin
    if (~'Key0_Slot_Load_permitted)
      next_state = LOAD_KEY2;
    else if (~'Key0_Slot_Load_trigger)
      next_state = curr_state;
    else if ('Key0_Slot_Multi_destination == 1)
      <load Key0 to default destination 0>
    else begin
      if ('Key0_Slot_Multi_destination && 3'b001 == 3'b001)
        <load Key0 to destination 0>
      if ('Key0_Slot_Multi_destination && 3'b010 == 3'b010)
        <load Key0 to destination 1>
      if ('Key0_Slot_Multi_destination && 3'b100 == 3'b100)
        <load Key0 to destination 2>
      next_state = LOAD_KEY2;
    end
  end
  LOAD_KEY2: begin
    if (~'Key2_Slot_Load_permitted)
      next_state = WAIT_FOR_CMD;
    else if (~'Key2_Slot_Load_trigger)
      next_state = curr_state;
    else if ('Key2_Slot_Multi_destination == 1)
      <load key2 to default destination 0>
    else begin
      if ('Key2_Slot_Multi_destination && 3'b001 == 3'b001)
        <load key2 to destination 0>
      if ('Key2_Slot_Multi_destination && 3'b010 == 3'b010)
        <load key2 to destination 1>
      if ('Key2_Slot_Multi_destination && 3'b100 == 3'b100)
        <load key2 to destination 2>
      next_state = WAIT_FOR_CMD;
    end
  end
  WAIT_FOR_CMD: begin
    if (cmd_written) begin
      csm_busy = 1'b1;
      next_state = VALIDITY_CHK;
    end
  end
  VALIDITY_CHK: begin
    csm_busy = 1'b1;
    if (cmd_valid) begin
      <Execute Command>
      next_state = PASS_STATE;
    end
    else begin
      next_state = ERROR_STATE;
    end
  end
  PASS_STATE: begin
    <provide status to firmware>
    next_state = WAIT_FOR_CMD;
  end
  ERROR_STATE: begin
    <provide fail status to firmware>
    next_state = WAIT_FOR_CMD;
  end
end
```

TABLE 11-continued

```
endcase
end
endmodule
```

Still referring to FIG. 5, having met any requirements associated with state and requester, hardware state machine 540 may perform additional information, including reading, writing, loading, or programming. As described earlier, these actions may be performed only if certain static or dynamic conditions associated with the fuse region are met. As an example, Table 11 shows a number of load instructions corresponding to the various attribute types. While Table 11 shows certain instructions, it does not include all of the possible instructions that may be included as part of hardware state machine 540.

With continued reference to FIG. 5, memory 500 may further include compiler 550. Compiler 550 may execute a multistep process. As an example, compiler 550 may check the files being processed (e.g., the HDL files corresponding to a fuse map and the state machine file) for syntax errors or other errors. Compiler 550 may also resolve the text macros (e.g., the text macros in the define file(s) described earlier). As an example, compiler 550 may process start address in the text string form and first replace it with a number, and then synthesize the HDL file(s) (e.g. Verilog files described earlier) into gates (e.g., AND, OR, AND/OR, XOR gates), which may be stored as output file(s) 560 in memory 500. In one example, compiler 550 may not translate the Verilog files into gates; instead compiler 550 may transform these files for use with a simulation tool. Although FIG. 5 shows memory 500 with a certain number and type of modules, additional or fewer modules may be used. As an example, the functionality of parser 520 and compiler 550 may be combined.

Figure 6:
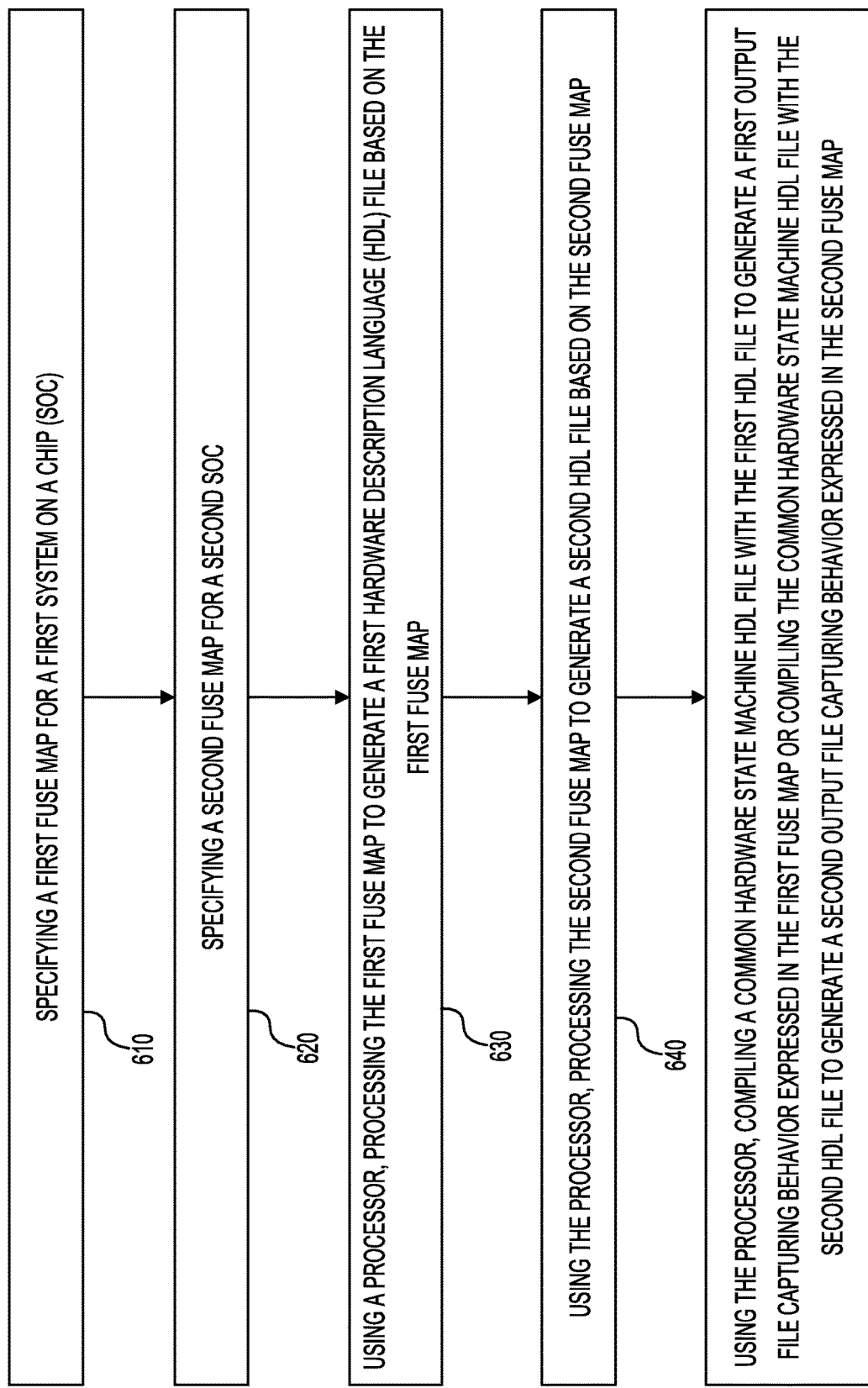
FIG. 6 shows a flow chart of a method for generating hardware description for a fuse macro in accordance with one example.

FIG. 6 shows a flow chart 600 of a method for generating hardware description for a fuse macro in accordance with one example. In this example, this method may be performed using system 400 of FIG. 4. Step 610 may include specifying a first fuse map for a first system on a chip (SoC). Step 620 may include specifying a second fuse map for the second SoC, different from the first SoC. In this example, a chip designer may specify both the first fuse map and the second fuse map. Example fuse maps, as described earlier, may include fuse regions that may comprise attributes to ensure at least one of authenticity, confidentiality, or integrity for a respective fuse region. The fuse maps may be stored in a memory (e.g., as fuse map(s) 510 in memory 500).

Step 630 may include, using a processor, processing the first fuse map to generate a first hardware description language (HDL) file based on the first fuse map. Step 640 may include, using the processor, processing the second fuse map to generate a second HDL file based on the second fuse map. Instructions corresponding to parser 520 of FIG. 5, when executed by processor(s) 402, may perform these steps. The parser output may include HDL files.

Step 650 may include, using the processor, compiling a common hardware state machine HDL file with the first HDL file to generate a first output file capturing behavior expressed in the first fuse map or compiling the common hardware state machine HDL file with the second HDL file to generate a second output file capturing behavior expressed in the second fuse map. In this example, instructions corresponding to compiler 550, when executed by a processor (e.g., processor(s) 402), may perform this step. Common hardware state machine HDL file may correspond to hardware state machine 540 of FIG. 5. Although FIG. 6 describes the steps in a certain order, they need not be performed in this order.

Figure 7:
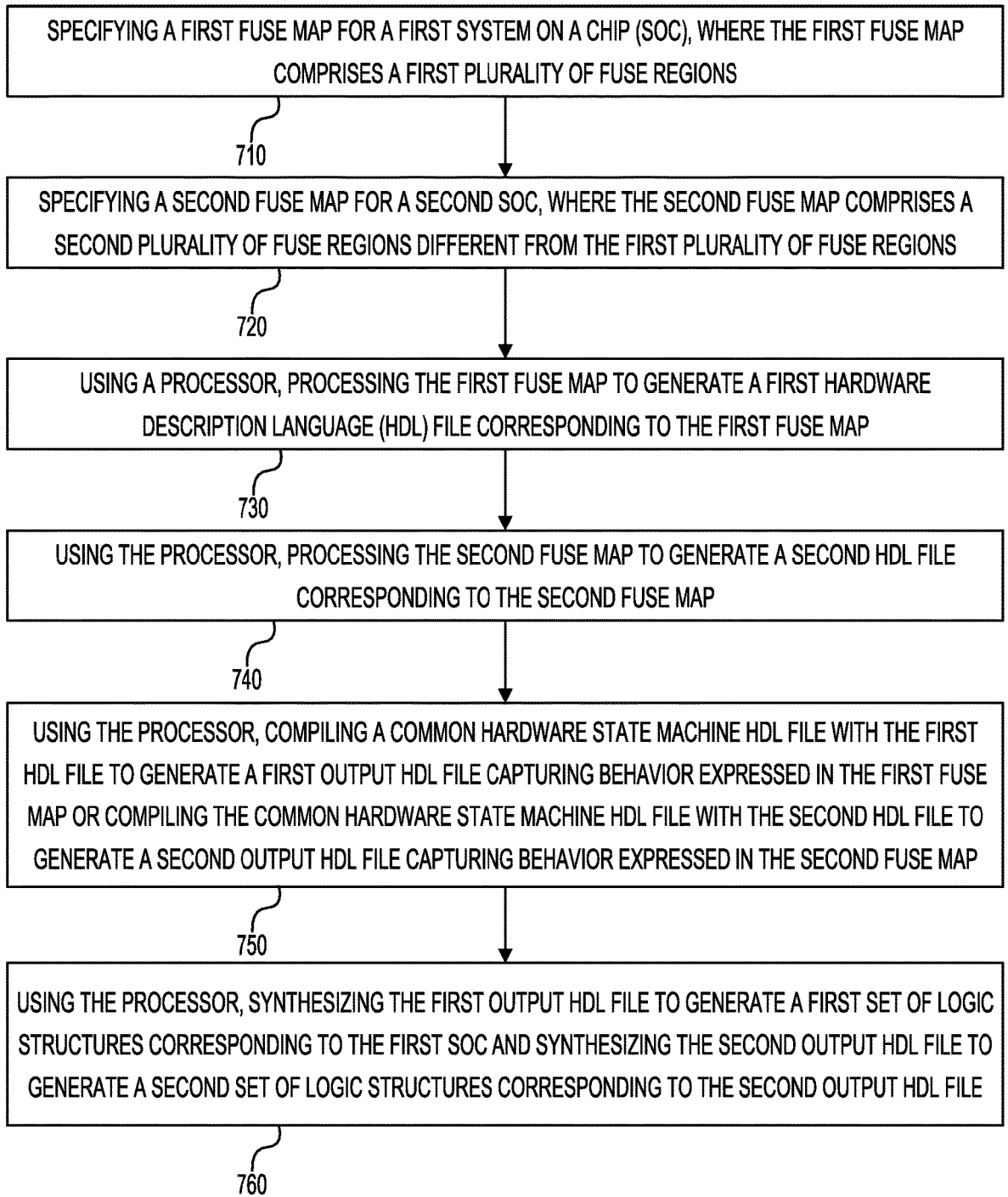
FIG. 7 shows a flow chart of another method for generating hardware description for a fuse macro in accordance with one example.

FIG. 7 shows a flow chart 700 of another method for generating hardware description for a fuse macro in accordance with one example. In this example, this method may be performed using system 400 of FIG. 4. Step 710 may include specifying a first fuse map for a first system on a chip (SoC), where the first fuse map comprises a first plurality of fuse regions. Step 720 may include specifying a second fuse map for a second SoC, different from the first SoC, where the second fuse map comprises a second plurality of fuse regions. In this example, a chip designer may specify both the first fuse map and the second fuse map. Example fuse regions, as described earlier, may comprise attributes to ensure at least one of authenticity, confidentiality, or integrity for a respective fuse region. The fuse maps may be stored in a memory (e.g., as fuse map(s) 510 in memory 500).

Step 730 may include, using a processor, processing the first fuse map to generate a first hardware description language (HDL) file based on the first fuse map. Step 740 may include, using the processor, processing the second fuse map to generate a second HDL file based on the second fuse map. Instructions corresponding to parser 520 of FIG. 5, when executed by processor(s) 402, may perform these steps. The parser output may include HDL files.

Step 750 may include, using the processor, compiling a common hardware state machine HDL file with the first HDL file to generate a first output file capturing behavior expressed in the first fuse map or compiling the common hardware state machine HDL file with the second HDL file to generate a second output file capturing behavior expressed in the second fuse map. In this example, instructions corresponding to compiler 550, when executed by a processor (e.g., processor(s) 402), may perform this step. Common hardware state machine HDL file may correspond to hardware state machine 540 of FIG. 5.

Step 760 may include, using the processor, synthesizing the first output HDL file to generate a first set of logic structures corresponding to the first SoC and synthesizing the second output HDL file to generate a second set of logic structures corresponding to the second output HDL file. Instructions corresponding to the synthesis tool may be stored in memory 500 of FIG. 5. This step may include the execution of these instructions using processor(s) 402 of FIG. 4. Although FIG. 7 describes the steps in a certain order, they need not be performed in this order.

In conclusion, the present disclosure relates to a method, implemented by a processor, related to a first system on a chip (SoC) and a second SoC, different from the first SoC. The method may include specifying a first fuse map for the first SoC. The method may further include specifying a second fuse map for the second SoC. The method may further include using the processor, processing the first fuse map to generate a first hardware description language (HDL) file based on the first fuse map. The method may further include using the processor, processing the second fuse map to generate a second HDL file based on the second fuse map. The method may further include using the processor, compiling a common hardware state machine HDL file with the first HDL file to generate a first output file capturing behavior expressed in the first fuse map or compiling the common hardware state machine HDL file with the second HDL file to generate a second output file capturing behavior expressed in the second fuse map.

The specifying the first fuse map may comprise specifying a first fuse region, and where the specifying the second fuse map comprises specifying a second fuse region. Each of the first fuse region and the second fuse region may comprise a plurality of attribute types, where each of the plurality of attribute types is required for ensuring at least one of authenticity, confidentiality, or integrity for a respective fuse region.

The plurality of attribute types may include a first attribute type concerning any permissions associated with reading, writing, or programming of a respective fuse region by a processing unit or a hardware block associated with a respective SoC. The plurality of attribute types may include a second attribute type concerning any permissions or timing associated with a loading of a respective fuse region to a destination. The plurality of attribute types may include a third attribute type concerning any encoding associated with a respective fuse region. The plurality of attribute types may include a fourth attribute type concerning any integrity protection method associated with a respective fuse region. Any value for each of the plurality of attribute types may correspond to a fixed value or a dynamic value assigned by a trusted entity.

In another example, the present disclosure relates to a method, implemented by a processor, for generating hardware description for first a system on a chip (SoC) or a second SoC, different from the first SoC. The method may include specifying a first fuse map for the first SoC, where the first fuse map comprises a first plurality of fuse regions. The method may include specifying a second fuse map for the second SoC, where the second fuse map comprises a second plurality of fuse regions different from the first plurality of fuse regions. The method may include using the processor, processing the first fuse map to generate a first hardware description language (HDL) file corresponding to the first fuse map. The method may include using the processor, processing the second fuse map to generate a second HDL file corresponding to the second fuse map. The method may include using the processor, compiling a common hardware state machine HDL file with the first HDL file to generate a first output HDL file capturing behavior expressed in the first fuse map or compiling the common hardware state machine HDL file with the second HDL file to generate a second output HDL file capturing behavior expressed in the second fuse map. The method may include using the processor, compiling a common hardware state machine HDL file with the first HDL file to generate a first output HDL file capturing behavior expressed in the first fuse map or compiling the common hardware state machine HDL file with the second HDL file to generate a second output HDL file capturing behavior expressed in the second fuse map.

Each of the first plurality of fuse regions and the second plurality of fuse regions may comprise a plurality of attribute types, where each of the plurality of attribute types is required for ensuring at least one of authenticity, confidentiality, or integrity for a respective fuse region. The plurality of attribute types may include a first attribute type concerning any permissions associated with reading, writing, or programming of a respective fuse region by a processing unit or a hardware block associated with a respective SoC. The plurality of attribute types may include a second attribute type concerning any permissions or timing associated with a loading of a respective fuse region to a destination. The plurality of attribute types may include a third attribute type concerning any encoding associated with a respective fuse region. The plurality of attribute types may include a fourth attribute type concerning any integrity protection method associated with a respective fuse region. Any value for each of the plurality of attribute types may correspond to a fixed value or a dynamic value assigned by a trusted entity.

In another example, the present disclosure relates to a system, including a processor, for processing fuse regions related to a first system on a chip (SoC) and a second SoC, different from the first SoC. The system may be configured to receive a first fuse map for the first SoC. The system may further be configured to receive a second fuse map for the second SoC. The system may further be configured to using the processor, process the first fuse map to generate a first hardware description language (HDL) file based on the first fuse map. The system may further be configured to using the processor, process the second fuse map to generate a second HDL file based on the second fuse map. The system may further be configured to using the processor, compile a common hardware state machine HDL file with the first HDL file to generate a first output file capturing behavior expressed in the first fuse map or compile the common hardware state machine HDL file with the second HDL file to generate a second output file capturing behavior expressed in the second fuse map.

The first fuse map may comprise a first fuse region and the second fuse map may comprise a second fuse region. Each of the first fuse region and the second fuse region may comprise a plurality of attribute types, where each of the plurality of attribute types is required for ensuring at least one of authenticity, confidentiality, or integrity for a respective fuse region.

The plurality of attribute types may include: (1) a first attribute type concerning any permissions associated with reading, writing, or programming of a respective fuse region by a processing unit or a hardware block associated with a respective SoC; (2) a second attribute type concerning any permissions or timing associated with a loading of a respective fuse region to a destination associated with a respective SoC; (3) a third attribute type concerning any encoding associated with a respective fuse region; and (4) a fourth attribute type concerning any integrity protection method associated with a respective fuse region. Each of the plurality of attribute types may correspond to a fixed value or a dynamic value assigned by a trusted entity.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a processor, related to a first system on a chip (SoC) and a second SoC, different from the first SoC, the method comprising:
   specifying a first fuse map for the first SoC;
   specifying a second fuse map for the second SoC;
   using the processor, processing the first fuse map to generate a first hardware description language (HDL) file based on the first fuse map;
   using the processor, processing the second fuse map to generate a second HDL file based on the second fuse map; and
   using the processor, compiling a common hardware state machine HDL file with the first HDL file to generate a first output file capturing behavior expressed in the first fuse map or compiling the common hardware state machine HDL file with the second HDL file to generate a second output file capturing behavior expressed in the second fuse map.

2. The method of claim 1, wherein the specifying the first fuse map comprises specifying a first fuse region, and wherein the specifying the second fuse map comprises specifying a second fuse region.

3. The method of claim 2, wherein each of the first fuse region and the second fuse region comprises a plurality of attribute types, wherein each of the plurality of attribute types is required for ensuring at least one of authenticity, confidentiality, or integrity for a respective fuse region.

4. The method of claim 3, wherein the plurality of attribute types includes a first attribute type concerning any permissions associated with reading, writing, or programming of a respective fuse region by a processing unit or a hardware block associated with a respective SoC.

5. The method of claim 3, wherein the plurality of attribute types includes a second attribute type concerning any permissions or timing associated with a loading of a respective fuse region to a destination.

6. The method of claim 3, wherein the plurality of attribute types includes a third attribute type concerning any encoding associated with a respective fuse region.

7. The method of claim 3, wherein the plurality of attribute types includes a fourth attribute type concerning any integrity protection method associated with a respective fuse region.

8. The method of claim 3, wherein any value for each of the plurality of attribute types corresponds to a fixed value or a dynamic value assigned by a trusted entity.

9. A method, implemented by a processor, for generating hardware description for a first system on a chip (SoC) or a second SoC, different from the first SoC, the method comprising:
   specifying a first fuse map for the first SoC, wherein the first fuse map comprises a first plurality of fuse regions;
   specifying a second fuse map for the second SoC, wherein the second fuse map comprises a second plurality of fuse regions different from the first plurality of fuse regions;
   using the processor, processing the first fuse map to generate a first hardware description language (HDL) file corresponding to the first fuse map;
   using the processor, processing the second fuse map to generate a second HDL file corresponding to the second fuse map;
   using the processor, compiling a common hardware state machine HDL file with the first HDL file to generate a first output HDL file capturing behavior expressed in the first fuse map or compiling the common hardware state machine HDL file with the second HDL file to generate a second output HDL file capturing behavior expressed in the second fuse map; and
   using the processor, synthesizing the first output HDL file to generate a first set of logic structures corresponding to the first SoC and synthesizing the second output HDL file to generate a second set of logic structures corresponding to the second output HDL file.

10. The method of claim 9, wherein each of the first plurality of fuse regions and the second plurality of fuse regions comprises a plurality of attribute types, wherein each of the plurality of attribute types is required for ensuring at least one of authenticity, confidentiality, or integrity for a respective fuse region.

11. The method of claim 10, wherein the plurality of attribute types includes a first attribute type concerning any permissions associated with reading, writing, or programming of a respective fuse region by a processing unit or a hardware block associated with a respective SoC.

12. The method of claim 10, wherein the plurality of attribute types includes a second attribute type concerning any permissions or timing associated with a loading of a respective fuse region to a destination.

13. The method of claim 10, wherein the plurality of attribute types includes a third attribute type concerning any encoding associated with a respective fuse region.

14. The method of claim 10, wherein the plurality of attribute types includes a fourth attribute type concerning any integrity protection method associated with a respective fuse region.

15. The method of claim 10, wherein any value for each of the plurality of attribute types corresponds to a fixed value or a dynamic value assigned by a trusted entity.

16. A system, including a processor, for processing fuse regions related to a first system on a chip (SoC) and a second SoC, different from the first SoC, the system configured to:
receive a first fuse map for the first SoC;
receive a second fuse map for the second SoC;
using the processor, process the first fuse map to generate a first hardware description language (HDL) file based on the first fuse map;
using the processor, process the second fuse map to generate a second HDL file based on the second fuse map; and
using the processor, compile a common hardware state machine HDL file with the first HDL file to generate a first output file capturing behavior expressed in the first fuse map or compile the common hardware state machine HDL file with the second HDL file to generate a second output file capturing behavior expressed in the second fuse map.

17. The system of claim 16, wherein the first fuse map comprises a first fuse region, and wherein the second fuse map comprises a second fuse region.

18. The system of claim 17, wherein each of the first fuse region and the second fuse region comprises a plurality of attribute types, wherein each of the plurality of attribute types is required for ensuring at least one of authenticity, confidentiality, or integrity for a respective fuse region.

19. The system of claim 18, wherein the plurality of attribute types includes: (1) a first attribute type concerning any permissions associated with reading, writing, or programming of a respective fuse region by a processing unit or a hardware block associated with a respective SoC; (2) a second attribute type concerning any permissions or timing associated with a loading of a respective fuse region to a destination associated with a respective SoC; (3) a third attribute type concerning any encoding associated with a respective fuse region; and (4) a fourth attribute type concerning any integrity protection method associated with a respective fuse region.

20. The system of claim 17, wherein any value for each of the plurality of attribute types corresponds to a fixed value or a dynamic value assigned by a trusted entity.

* * * * *